(12) United States Patent
Trainin et al.

(10) Patent No.: US 9,736,857 B2
(45) Date of Patent: Aug. 15, 2017

(54) TECHNIQUES FOR INTERFERENCE MITIGATION IN DIRECTIONAL MULTI-GIGABIT NETWORKS

(71) Applicant: INTEL IP CORPORATION, Santa Clara, CA (US)

(72) Inventors: Solomon Trainin, Haifa (IL); Oren Kedem, Modiin Maccabim-Reut (IL); Tom Harel, Shfaim (IL); Ran Mor, Petach-Tikva (IL)

(73) Assignee: INTEL IP CORPORATION, Santa Clara, CA (US)

( * ) Notice: Subject to any disclaimer, the term of this patent is extended or adjusted under 35 U.S.C. 154(b) by 272 days.

(21) Appl. No.: 14/293,871

(22) Filed: Jun. 2, 2014

(65) Prior Publication Data

US 2015/0351102 A1 Dec. 3, 2015

(51) Int. Cl.
*H04W 72/12* (2009.01)

(52) U.S. Cl.
CPC .............................. *H04W 72/1278* (2013.01)

(58) Field of Classification Search
None
See application file for complete search history.

(56) References Cited

U.S. PATENT DOCUMENTS

| | | | | |
|---|---|---|---|---|
| 2009/0252143 | A1* | 10/2009 | Sridhara | H04L 1/1685 370/345 |
| 2013/0089036 | A1* | 4/2013 | Cho | H04W 74/085 370/329 |
| 2013/0155931 | A1* | 6/2013 | Prajapati | H04W 72/044 370/311 |
| 2014/0010211 | A1* | 1/2014 | Asterjadhi | H04W 72/0446 370/336 |

* cited by examiner

*Primary Examiner* — Christine Duong

(57) ABSTRACT

Techniques for interference mitigation in directional multi-gigabit networks are described. In one embodiment, for example, an apparatus may comprise logic, at least a portion of which is in hardware, the logic to send, from a source device, a first reverse direction grant (RDG) indicating that a sink device may transmit to the source device, detect interference with a received sink device data transmission at the source device, select a grant deferral period, and upon conclusion of the grant deferral period, send a second RDG indicating that the sink device may transmit to the source device. Other embodiments are described and claimed.

19 Claims, 12 Drawing Sheets

US 9,736,857 B2

TECHNIQUES FOR INTERFERENCE MITIGATION IN DIRECTIONAL MULTI-GIGABIT NETWORKS

TECHNICAL FIELD

Embodiments herein generally relate to wireless communications between devices in wireless networks.

BACKGROUND

In a directional multi-gigabit (DMG) wireless communications network, directional transmission and reception techniques may be employed that generally enable spatial frequency reuse among devices in relatively close proximity. Although the use of directional transmission and reception may reduce the tendency of communications of neighboring devices to interfere with each other, interference may still occur. When interference does occur in a DMG network, the directional nature of transmission and reception may render conventional approaches to interference mitigation less practical and/or desirable. For example, carrier sensing techniques may not be well suited for use in DMG networks because directional transmission and reception may make it more difficult for a given device to determine whether an overheard transmission will actually interfere with a prospective transmission to a particular node. As such, techniques for interference detection and avoidance in DMG networks may be desirable.

DETAILED DESCRIPTION

Various embodiments may be generally directed to techniques for interference mitigation in directional multi-gigabit networks. In one embodiment, for example, an apparatus may comprise logic, at least a portion of which is in hardware, the logic to send, from a source device, a first reverse direction grant (RDG) indicating that a sink device may transmit to the source device, detect interference with a received sink device data transmission at the source device, select a grant deferral period, and upon conclusion of the grant deferral period, send a second RDG indicating that the sink device may transmit to the source device. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1A:
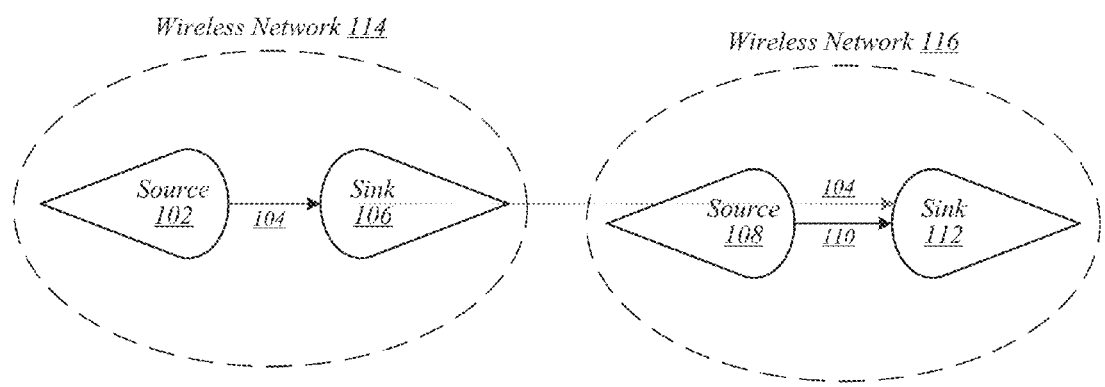
FIG. 1A illustrates one embodiment of a first operating environment.

FIG. 1A illustrates an example of an operating environment 100 such as may be representative of various embodiments. As shown in FIG. 1A, a source 102 may send a wireless transmission 104 to a sink 106, and a source 108 may send a wireless transmission 110 to a sink 112. More particularly, sources 102 and 108 may use directional transmission techniques to send respective wireless transmissions 104 and 110, and sinks 106 and 112 may use directional reception techniques to receive respective wireless transmissions 104 and 110.

In some embodiments, source 102 and sink 106 may be comprised in a wireless network 114, while source 108 and sink 112 may be comprised in a different wireless network 116. In various embodiments, wireless networks 114 and/or 116 may comprise DMG networks. In some embodiments, devices in wireless networks 114 and/or 116 may communicate according to one or more standards for multi-gigabit wireless communications. For example, in various embodiments, devices in wireless networks 114 and/or 116 may communicate according to the Institute of Electrical and Electronics Engineers (IEEE) 802.1 lad standard, 2012 release, and/or any revisions, progeny, and/or variants thereof. In some embodiments, devices in wireless networks 114 and/or 116 may communicate according to one or more Wireless Gigabit (WiGig) standards promulgated by the Wi-Fi Alliance (WFA). In various embodiments, wireless networks 114 and 116 may comprise different private basic service sets (PBSSs) 114. In some embodiments, wireless networks 114 and 116 may be located in close enough proximity that transmission coverage areas of their respective devices may overlap. For example, in various embodiments, wireless networks 114 and 116 may comprise overlapping basic service sets (OBSSs).

In some embodiments, the use of directional transmission and reception techniques to enable spatial frequency reuse may mitigate some of the potential for interference between wireless networks 114 and 116. However, in various embodiments, the physical arrangements of devices in wireless network 114 and wireless network 116 may be such that the likelihood of interference is increased at some devices. For example, in operating environment 100, source 102 and sink 112 approximately face each other. As such, wireless transmission 104 may reach sink 112 and interfere with wireless transmission 110. Since source 108 and sink 112 are in a different wireless network than source 102, neither source 108 nor sink 112 may have any way of coordinating with source 102 in order to avoid the interference caused by wireless transmission 104. Furthermore, source 108 may not even be able to directly detect wireless transmission 104, since source 108 is oriented away from the direction from which wireless transmission 104 originates.

Figure 1B:
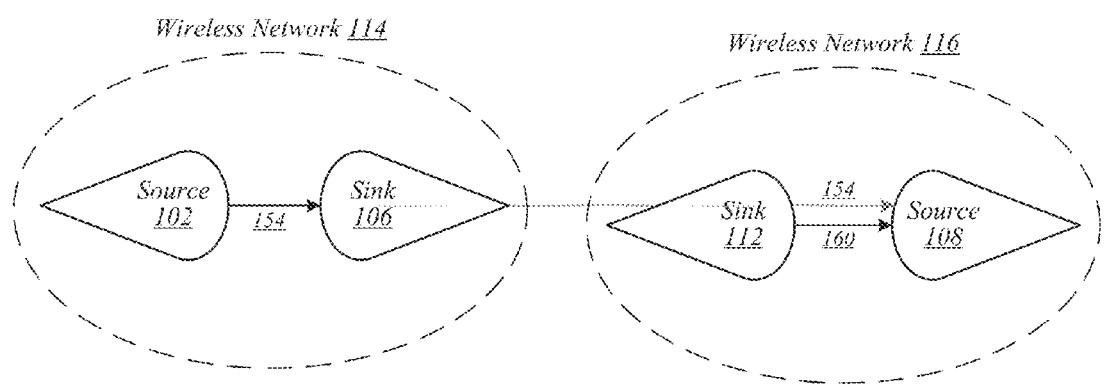
FIG. 1B illustrates one embodiment of a second operating environment.

FIG. 1B illustrates an example of an operating environment 150 such as may be representative of some embodiments. More particularly, FIG. 1B comprises an example of an operating environment 150 in which a transmission of a source interferes with a transmission of a sink. In operating environment 150, the physical arrangement of source 108 and sink 112 is reversed with respect to the physical arrangement of those devices in operating environment 100 of FIG. 1A, such that source 102 and source 108 approximately face each other. As a result, a wireless transmission 154 of source 102 may reach source 108 and interfere with a wireless transmission 160 sent from sink 112 to source 108. As in FIG. 1A, neither source 108 nor sink 112 may have any way of coordinating with source 102 in order to avoid the interference caused by the wireless transmission from source 102. Furthermore, sink 112 may not even be able to directly detect wireless transmission 154, since sink 112 is oriented away from the direction from which wireless transmission 154 originates.

Disclosed herein are techniques that may be implemented in various embodiments in order to mitigate the potential for interference in DMG networks in scenarios such as those in the examples of FIGS. 1A and 1B. According to some such DMG network interference mitigation techniques, a deferral period may be initiated upon a detection of interference at a receiving device, and a transmitting device may wait until after the deferral period to reattempt transmission. In various embodiments, the receiving device may be a sink, while in other embodiments, the receiving device may be a source. In some embodiments, the interference mitigation techniques may be implemented in conjunction with a reverse direction protocol. In various embodiments, according to the reverse direction protocol, a transmission opportunity (TXOP) holder with respect to a given time duration may be capable of delegating the TXOP to another device using a reverse direction grant (RDG). In some embodiments, source 108 of FIGS. 1A and 1B may comprise a TXOP holder with respect to a particular time duration and may transmit an RDG to sink 112, and the RDG may indicate that sink 112 may transmit to source 108 during that time duration. The embodiments are not limited in this context.

Figure 2:
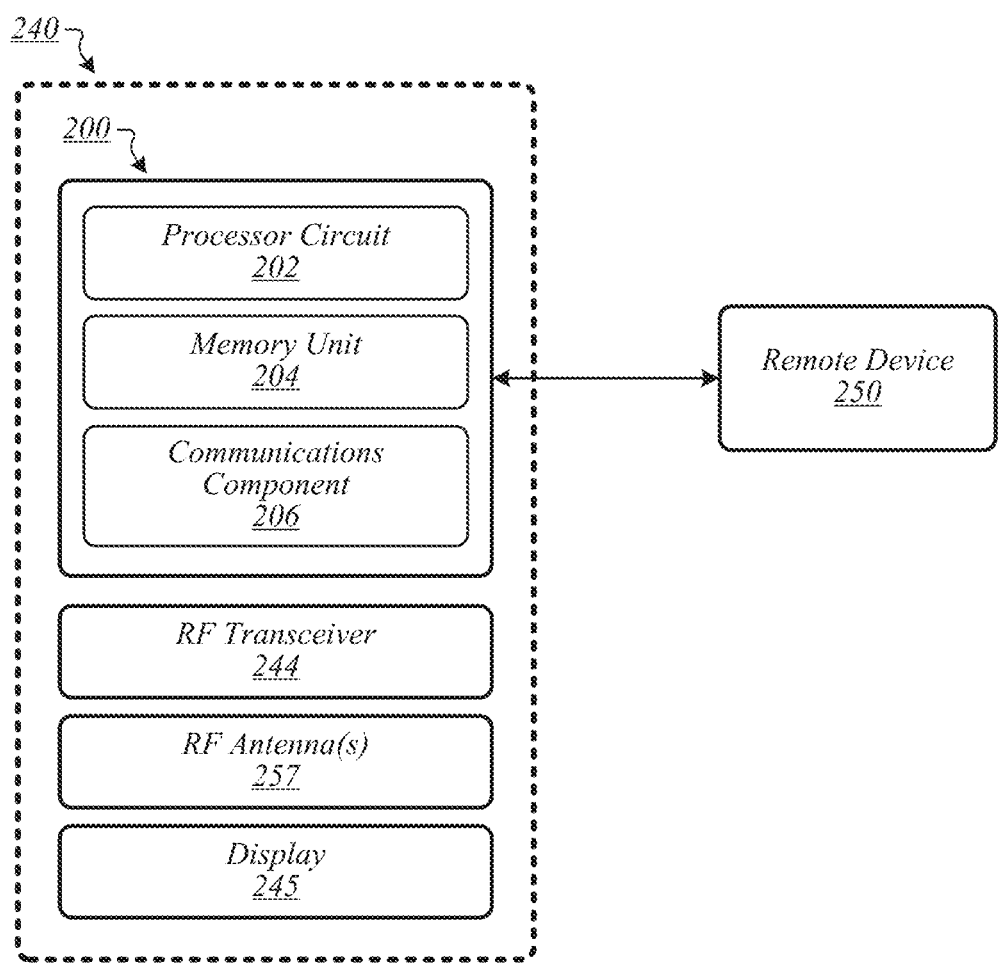
FIG. 2 illustrates one embodiment of an apparatus and one embodiment of a system.

FIG. 2 illustrates a block diagram of an apparatus 200 such as may implement one or more DMG network interference mitigation techniques in various embodiments. Apparatus 200 may generally comprise a wireless communications device. More particularly, apparatus 200 may comprise a wireless communications device capable of operating as a source such as source 108 of FIGS. 1A and/or 1B, capable of operating as a sink such as sink 112 of FIGS. 1A and/or 1B, or both. In some embodiments, apparatus 200 may be configured to communicate in a DMG network using directional transmission and/or reception techniques. As shown in FIG. 2, apparatus 200 comprises multiple elements including a processor circuit 202, a memory unit 204, and a communications component 206. The embodiments, however, are not limited to the type, number, or arrangement of elements shown in this figure.

In various embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In some embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

In various embodiments, apparatus 200 may comprise a communications component 206. Communications component 206 may comprise logic, circuitry, and/or instructions operative to send messages to one or more remote devices and/or to receive messages from one or more remote devices. In some embodiments, communications component 206 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

FIG. 2 also illustrates a block diagram of a system 240. System 240 may comprise any of the aforementioned elements of apparatus 200. System 240 may further comprise a radio frequency (RF) transceiver 244. RF transceiver 244 may comprise one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks.

In communicating across such networks, RF transceiver 244 may operate in accordance with one or more applicable standards in any version. The embodiments are not limited in this context.

In some embodiments, system 240 may comprise one or more RF antennas 257. Examples of any particular RF antenna 257 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In various embodiments, RF transceiver 244 may be operative to send and/or receive messages and/or data using one or more RF antennas 257. The embodiments are not limited to these examples.

In some embodiments, system 240 may comprise a display 245. Display 245 may comprise any display device capable of displaying information received from processor circuit 202. Examples for display 245 may include a television, a monitor, a projector, and a computer screen. In one embodiment, for example, display 245 may be implemented by a liquid crystal display (LCD), light emitting diode (LED) or other type of suitable visual interface. Display 245 may comprise, for example, a touch-sensitive display screen ("touchscreen"). In various implementations, display 245 may comprise one or more thin-film transistors (TFT) LCD including embedded transistors. The embodiments, however, are not limited to these examples.

In various embodiments, apparatus 200 and/or system 240 may be operative to wirelessly communicate with a remote device 250. In some embodiments, communications component 206 may be operative to send one or more messages to remote device 250 and/or to receive one or more messages to remote device 250. In various embodiments, apparatus 200 and/or system 240 and remote device 250 may comprise devices in a DMG network and may exchange communications according to one or more DMG wireless communications standards. In an example embodiment, apparatus 200 and/or system 240 may comprise the source 108 in wireless network 116 of FIGS. 1A and 1B, and remote device 250 may comprise the sink 112 in wireless network 116 of FIGS. 1A and 1B. In another example embodiment, apparatus 200 and/or system 240 may comprise the sink 112 in wireless network 116 of FIGS. 1A and 1B, and remote device 250 may comprise the source 108 in wireless network 116 of FIGS. 1A and 1B. The embodiments are not limited to these examples.

Figure 3:
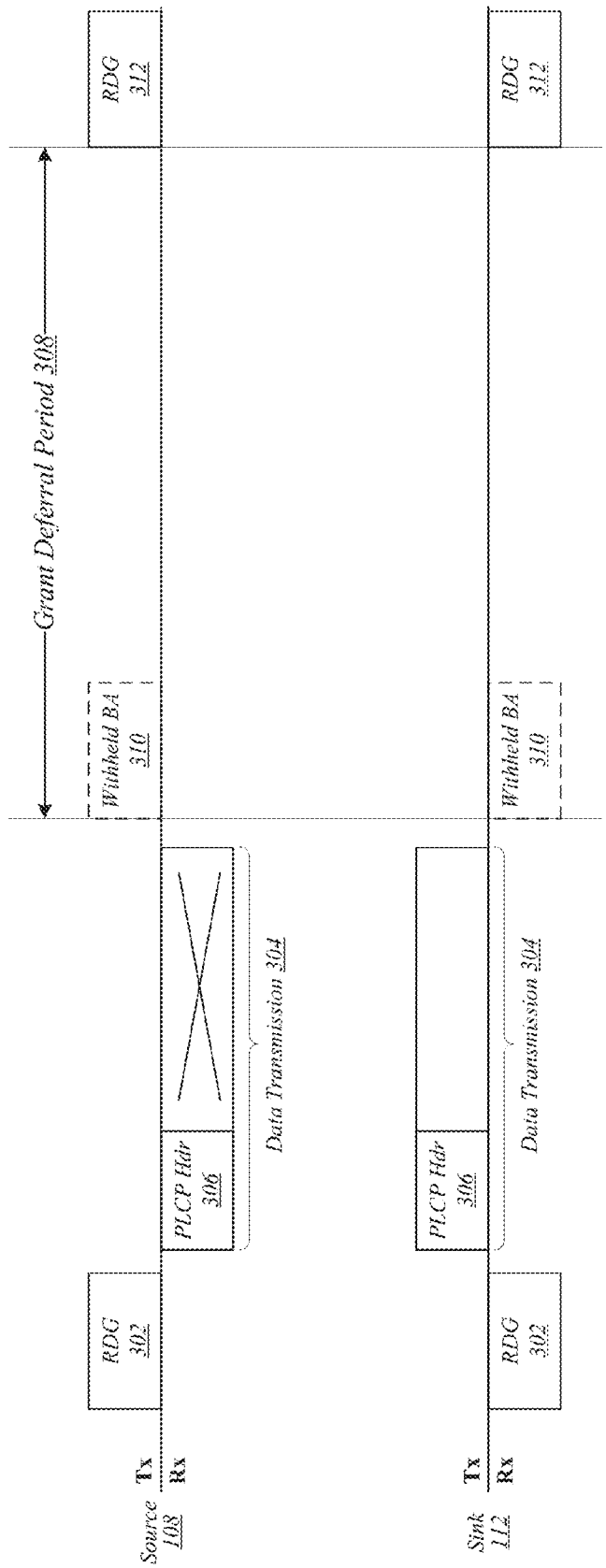
FIG. 3 illustrates one embodiment of a first communications flow.

FIG. 3 illustrates an example of a communications flow 300 such as may be representative of some embodiments. More particularly, with respect to operating environment 150 of FIG. 1B, communications flow 300 may be representative of various embodiments in which interference mitigation techniques are utilized to detect and/or address interference with the message 160 sent from sink 112 to source 108. In some embodiments, the interference that is detected and/or addressed in communications flow 300 may be caused by a transmission originating from a device in a different wireless network. For example, with respect to operating environment 150 of FIG. 1B, communications flow 300 may involve detecting and/or addressing interference caused by the message 154 transmitted by source 102 in wireless network 114. The embodiments are not limited in this context.

In various embodiments, source 108 may comprise a transmission opportunity (TXOP) holder with respect to a particular time duration. In some embodiments, as shown in FIG. 3, source 108 may transmit an RDG 302 to sink 112.

In various embodiments, the RDG 302 may indicate that sink 112 may transmit to source 108 during the time duration with respect to which source 108 comprises a TXOP holder. In some embodiments, RDG 302 may comprise a field identifying that time duration. The embodiments are not limited in this context.

In response to RDG 302, sink 112 may send a data transmission 304 to source 108. In various embodiments, data transmission 304 may comprise a physical protocol data unit (PPDU). In some embodiments, data transmission 304 may include a physical layer convergence procedure (PLCP) header 306. In various embodiments, data transmission 304 may additionally contain one or more media access control (MAC) protocol data units (MPDUs). In some embodiments, data transmission 304 may include information indicating that acknowledgment of data transmission 304 is requested. In various embodiments, data transmission 304 may include a block acknowledgment request (BAR), comprising a request that source 108 provide a block acknowledgment (BA) for multiple MPDUs. In some embodiments, the multiple MPDUs may be comprised in an aggregate MPDU (A-MPDU). The embodiments are not limited in this context.

In various embodiments, source 108 may be operative to detect interference with data transmission 304 as it is received at source 108. In some embodiments, source 108 may be operative to successfully receive PLCP header 306, but may not successfully receive one or more remaining portions of data transmission 304. In various embodiments, source 108 may be operative to detect interference with data transmission 304 based on a determination that one or more portions of data transmission 304 have not been successfully received. In some embodiments, source 108 may be operative to perform cyclic redundancy code (CRC) validation on one or more portions of data transmission 304. In various embodiments, source 108 may be operative to detect interference with data transmission 304 based on one or more failed CRC validations. For example, in some embodiments, source 108 may be operative to determine the presence of interference based on a determination that a CRC validation has failed for an MPDU comprised within data transmission 304. The embodiments are not limited to this example.

In various embodiments, when it detects interference with data transmission 304, source 108 may be operative to select a grant deferral period 308. Grant deferral period 308 may comprise an amount of time that source 108 will wait before once again inviting sink 112 to transmit to source 108. In some embodiments, source 108 may be operative to randomly select the grant deferral period 308. In various embodiments, source 108 may be operative to select grant deferral period 308 subject to a constraint that it should elapse prior to the time duration with respect to which source 108 comprises a TXOP holder. The embodiments are not limited in this context.

In some embodiments, data transmission 304 may include an acknowledgment request such as a BAR and source 108 may withhold acknowledgment of data transmission 304 in order to notify sink 112 that data transmission 304 was not successfully received. In communications flow 300, an example of such a possibility is illustrated by withheld BA 310. Withheld BA 310 is depicted with dashed borders in order to signify that it is not a transmission/reception that actually occurs, but is rather a transmission/reception that does not occur because of the detected interference. Based on detected interference with data transmission 304, source 108 may withhold a BA that it would otherwise transmit to confirm receipt of data transmission 304, and may instead commence grant deferral period 308. The embodiments are not limited in this context.

Upon conclusion of grant deferral period 308, source 108 may be operative to transmit RDG 312 to sink 112. Like RDG 302, RDG 312 may indicate that sink 112 may transmit to source 108 during the time duration with respect to which source 108 comprises a TXOP holder, and may comprise a field identifying that time duration. In various embodiments, because it did not receive an acknowledgment for data transmission 304, sink 112 may abstain from further transmissions to source 108 until it receives a new invitation to transmit in the form of RDG 312. In some such embodiments, since source 108 waits until the conclusion of grant deferral period 308 before transmitting RDG 312, sink 112 does not transmit to source 108 during grant deferral period 308. The embodiments are not limited in this context.

Figure 4:
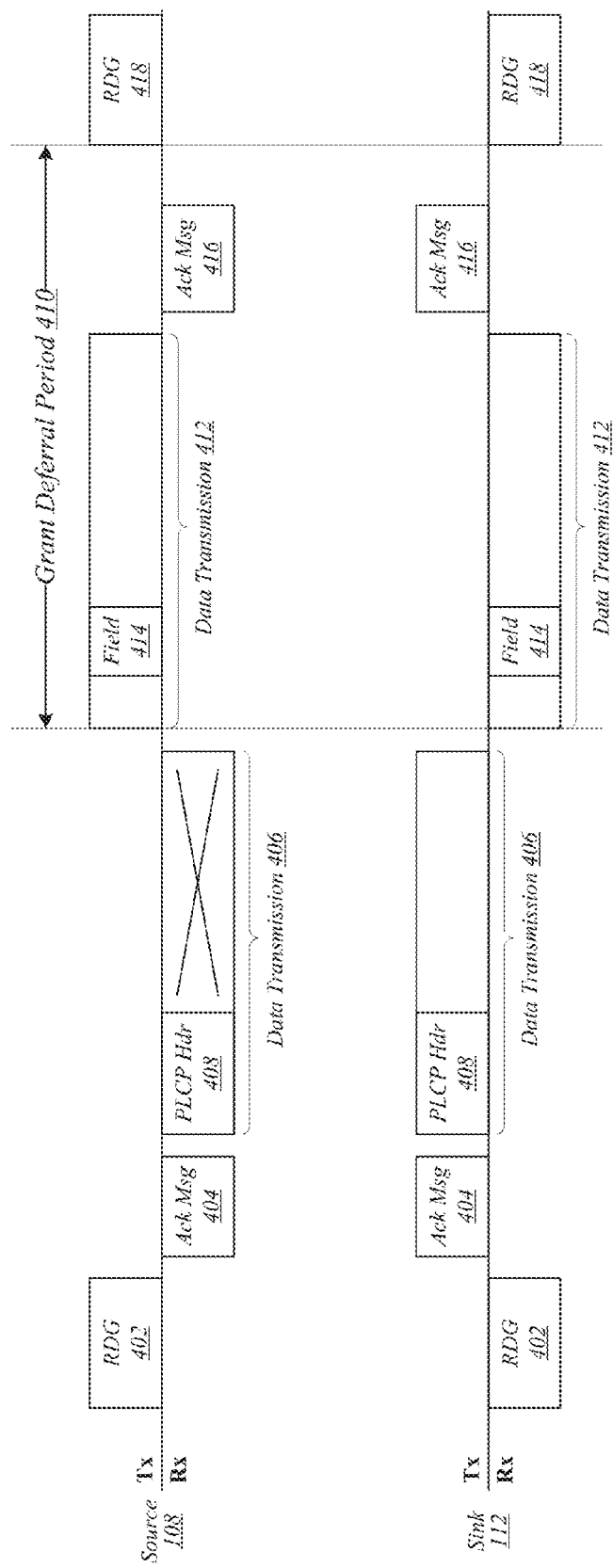
FIG. 4 illustrates one embodiment of a second communications flow.

FIG. 4 illustrates an example of a communications flow 400 such as may be representative of various embodiments. With respect to operating environment 150 of FIG. 1B, communications flow 400 may, like communications flow 300 of FIG. 3, be representative of some embodiments in which interference mitigation techniques are utilized to detect and/or address interference with the message 160 sent from sink 112 to source 108. In various embodiments, the interference that is detected and/or addressed in communications flow 400 may be caused by a transmission originating from a device in a different wireless network. For example, with respect to operating environment 150 of FIG. 1B, communications flow 400 may involve detecting and/or addressing interference caused by the message 154 transmitted by source 102 in wireless network 114. More particularly, communications flow 400 may be representative of some embodiments in which a source that addresses detected interference by initiating a grant deferral period, such as the source 108 that initiates grant deferral period 308 in FIG. 3, uses that grant deferral period to transmit data to a sink. The embodiments are not limited in this context.

In FIG. 4, as in FIG. 3, source 108 may comprise a TXOP holder with respect to a particular time duration in various embodiments. In some embodiments, source 108 may transmit an RDG 402 to sink 112. In various embodiments, the RDG 402 may indicate that sink 112 may transmit to source 108 during the time duration with respect to which source 108 comprises a TXOP holder. In some embodiments, RDG 402 may comprise a field identifying that time duration. The embodiments are not limited in this context. Following receipt of RDG 402 from source 108, sink 112 may be operative to send an acknowledgment message 404 to source 108. Acknowledgment message 404 may generally comprise an acknowledgment of RDG 402 and/or of one or more MPDUs within RDG 402. In various embodiments, acknowledgment message 404 may comprise a quality of service (QoS) MPDU or a BA MPDU. The embodiments are not limited in this context.

In some embodiments, following transmission of acknowledgment message 404, sink 112 may be operative to send a data transmission 406 to source 108. In various embodiments, data transmission 406 may comprise a PPDU. In some embodiments, data transmission 406 may include a PLCP header 408. In various embodiments, data transmission 406 may additionally contain one or more MPDUs. In some embodiments, data transmission 406 may include information indicating that acknowledgment of data transmission 406 is requested. In various embodiments, data transmission 406 may include a BAR, comprising a request that source 108 provide a BA for multiple MPDUs. In some embodiments, the multiple MPDUs may be comprised in an A-MPDU. The embodiments are not limited in this context.

In various embodiments, source 108 may be operative to successfully receive acknowledgment message 404 but then may detect interference with data transmission 406 as it is received at source 108. In some embodiments, source 108 may be operative to successfully receive PLCP header 408, but may not successfully receive one or more remaining portions of data transmission 406. In various embodiments, source 108 may be operative to detect interference with data transmission 406 based on a determination that one or more portions of data transmission 406 have not been successfully received. In some embodiments, source 108 may be operative to perform CRC validation on one or more portions of data transmission 406. In various embodiments, source 108 may be operative to detect interference with data transmission 406 based on one or more failed CRC validations. For example, in some embodiments, source 108 may be operative to determine the presence of interference based on a determination that a CRC validation has failed for an MPDU comprised within data transmission 406. The embodiments are not limited to this example.

In various embodiments, when it detects interference with data transmission 406, source 108 may be operative to select a grant deferral period 410. Grant deferral period 410 may comprise an amount of time that source 108 will wait before once again inviting sink 112 to transmit to source 108. In some embodiments, source 108 may be operative to randomly select the grant deferral period 410. In various embodiments, source 108 may be operative to select grant deferral period 410 subject to a constraint that it should elapse prior to the time duration with respect to which source 108 comprises a TXOP holder. The embodiments are not limited in this context.

In some embodiments, source 108 may be operative to determine that data may be transmitted to sink 112 during grant deferral period 410. In various embodiments, source 108 may be operative to perform this determination based on successful receipt of acknowledgment message 404. In some embodiments, source 108 may then be operative to send one or more PPDUs to sink 112 during grant deferral period 410. In various embodiments, for example, source 108 may be operative to send a data transmission 412 to sink 112 during the grant deferral period 410. In some embodiments, the data transmission 412 may include one or more MPDUs. In various embodiments, the data transmission 412 may include a field 414 containing a value indicating that sink 112 is not currently authorized to transmit to source 108. In some embodiments, the field 414 may comprise an RDG field comprising a '0' bit value. The embodiments are not limited to this example.

In various embodiments, sink 112 may be operative to successfully receive data transmission 412 from source 108 and may send an acknowledgment message 416 in response to data transmission 412. In some embodiments, data transmission 412 may comprise a plurality of MPDUs, and acknowledgement message 416 may comprise a BA for the plurality of MPDUs. In various embodiments, the plurality of MPDUs may be comprised in an A-MPDU, and acknowledgment message 416 may comprise a BA for the A-MPDU. The embodiments are not limited to these examples.

Upon conclusion of grant deferral period 410, source 108 may be operative to transmit RDG 418 to sink 112. Like RDG 402, RDG 418 may indicate that sink 112 may transmit to source 108 during the time duration with respect to which source 108 comprises a TXOP holder, and may comprise a field identifying that time duration. In some embodiments, based on the value in field 414, sink 112 may abstain from further transmissions to source 108 until it receives a new invitation to transmit in the form of RDG 418. In various such embodiments, since source 108 waits until the conclusion of grant deferral period 410 before transmitting RDG 418, sink 112 does not transmit to source 108 during grant deferral period 410. The embodiments are not limited in this context.

Figure 5:
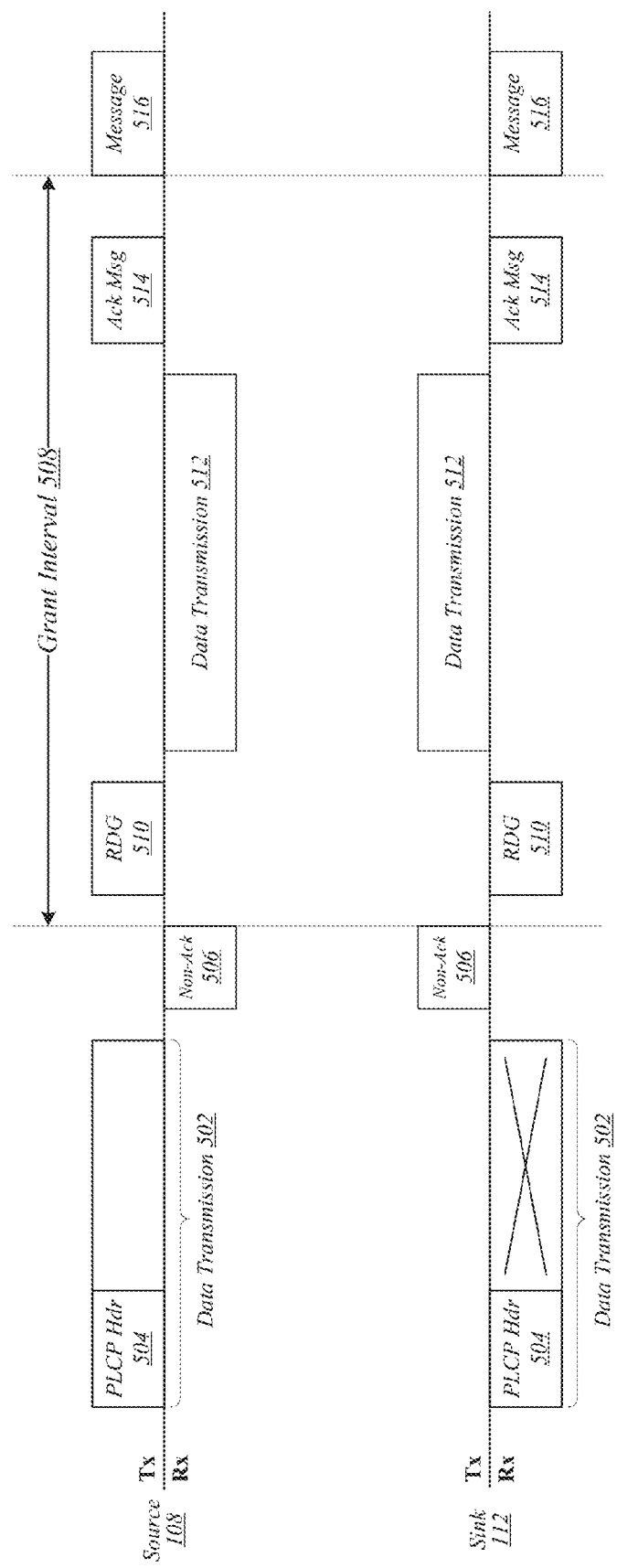
FIG. 5 illustrates one embodiment of a third communications flow.

FIG. 5 illustrates an example of a communications flow 500 such as may be representative of some embodiments. More particularly, with respect to operating environment 100 of FIG. 1A, communications flow 500 may be representative of various embodiments in which interference mitigation techniques are utilized to detect and/or address interference with the message 110 sent from source 108 to sink 112. In some embodiments, the interference that is detected and/or addressed in communications flow 500 may be caused by a transmission originating from a device in a different wireless network. For example, with respect to operating environment 100 of FIG. 1A, communications flow 500 may involve detecting and/or addressing interference caused by the message 104 transmitted by source 102 in wireless network 114. The embodiments are not limited in this context.

In various embodiments, source 108 may be operative to send a data transmission 502 to sink 112. In some embodiments, data transmission 502 may comprise a PPDU. In various embodiments, data transmission 502 may include a PLCP header 504. In some embodiments, data transmission 502 may additionally contain one or more MPDUs. In various embodiments, data transmission 502 may include information indicating that acknowledgment of data transmission 502 is requested. In some embodiments, data transmission 502 may include a BAR, comprising a request that sink 112 provide a BA for multiple MPDUs. In various embodiments, the multiple MPDUs may be comprised in an A-MPDU. The embodiments are not limited in this context.

In some embodiments, sink 112 may be operative to detect interference with data transmission 502 as it is received at sink 112. In various embodiments, sink 112 may be operative to successfully receive PLCP header 504, but may not successfully receive one or more remaining portions of data transmission 502. In some embodiments, sink 112 may be operative to detect interference with data transmission 502 based on a determination that one or more portions of data transmission 502 have not been successfully received. In various embodiments, sink 112 may be operative to perform CRC validation on one or more portions of data transmission 502. In some embodiments, sink 112 may be operative to detect interference with data transmission 502 based on one or more failed CRC validations. For example, in various embodiments, sink 112 may be operative to determine the presence of interference based on a determination that a CRC validation has failed for an MPDU comprised within data transmission 502. The embodiments are not limited to this example.

In some embodiments, based on the detected interference, sink 112 may be operative to send a non-acknowledgment message 506 to source 108. Non-acknowledgment message 506 may comprise a message that notifies source 108 that data transmission 502 was not successfully received. In various embodiments, non-acknowledgment message 506 may comprise a QoS Null message. In some embodiments, source 108 may be operative to receive the non-acknowledgment message 506 and may determine that interference exists at sink 112 based on the non-acknowledgment message 506. The embodiments are not limited in this context.

In various embodiments, source 108 may comprise a TXOP holder with respect to a particular time duration. In some embodiments, based on a determination that interference exists at sink 112, source 108 may be operative to select a grant interval 508. Grant interval 508 may comprise an amount of time that source 108 will refrain from attempting data transmissions to sink 112 and grant sink 112 the opportunity to transmit data to source 108. In various embodiments, source 108 may be operative to randomly select the grant interval 508. In some embodiments, source 108 may be operative to select grant interval 508 subject to a constraint that it should elapse prior to the time duration with respect to which source 108 comprises a TXOP holder. The embodiments are not limited in this context.

In various embodiments, source 108 may be operative to transmit an RDG 510 to sink 112 during grant interval 508. In some embodiments, the RDG 510 may indicate that sink 112 may transmit to source 108 during the time duration with respect to which source 108 comprises a TXOP holder. In various embodiments, RDG 510 may comprise a field identifying that time duration. The embodiments are not limited in this context.

In response to RDG 510, sink 112 may send a data transmission 512 to source 108 during grant interval 508. In some embodiments, data transmission 512 may comprise a PPDU, and may contain one or more MPDUs. In various embodiments, data transmission 512 may include information indicating that acknowledgment of data transmission 512 is requested. In some embodiments, data transmission 512 may include a BAR comprising a request that source 108 provide a BA for multiple MPDUs. In various embodiments, the multiple MPDUs may be comprised in an A-MPDU. The embodiments are not limited in this context.

In some embodiments, source 108 may be operative to successfully receive data transmission 512 from sink 112. In various embodiments, data transmission 512 may include an acknowledgment request, and source 108 may be operative to send an acknowledgment message 514 to acknowledge receipt of data transmission 512. In some embodiments, transmission 512 may include a BAR, and acknowledgment message 514 may comprise a BA. The embodiments are not limited in this context.

Upon conclusion of grant interval 508, source 108 may be operative to transmit a message 516 to sink 112. In various embodiments, message 516 may comprise a retransmission of one or more portions of data transmission 502 that were not successfully received by sink 112. For example, in some embodiments, non-acknowledgment message 506 may identify one or more MPDUs in data transmission 502 that were not successfully received by sink 112, and message 516 may comprise those one or more MPDUs. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
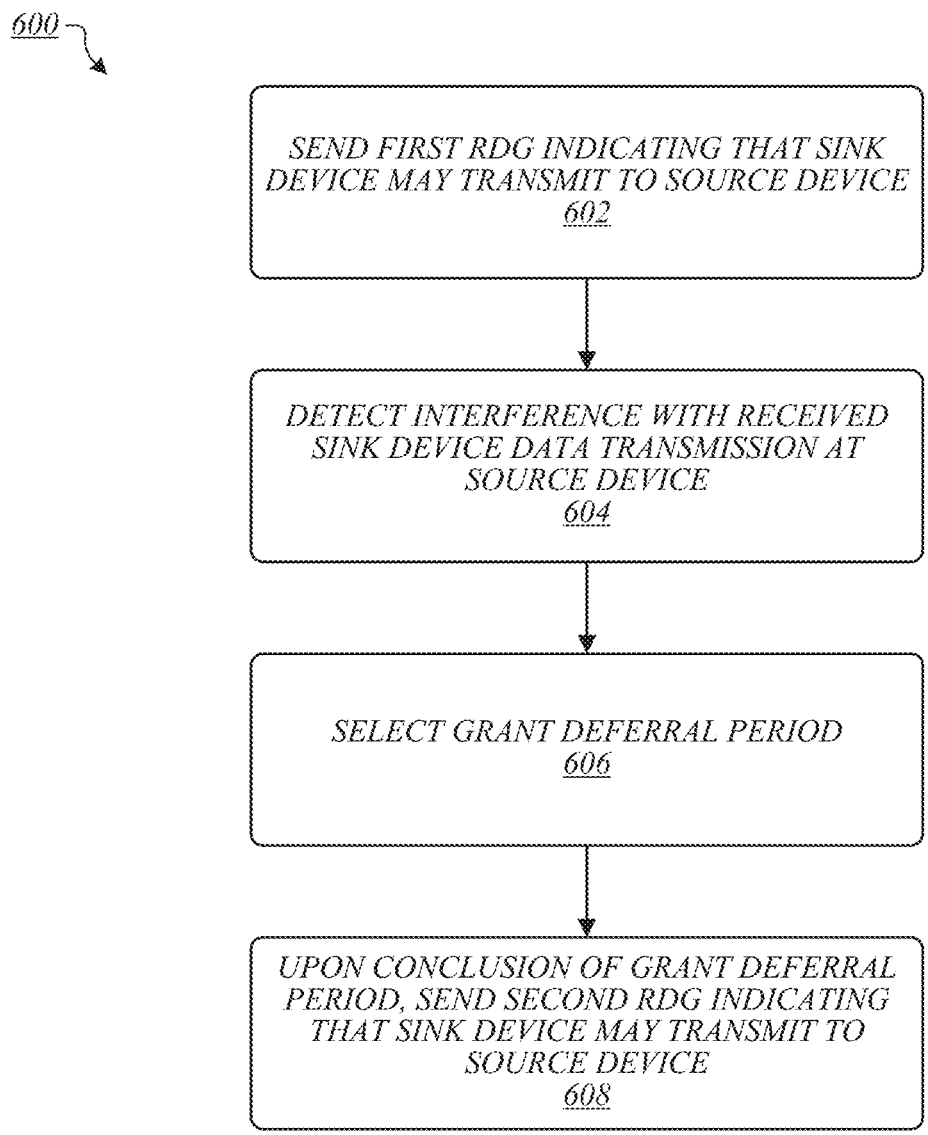
FIG. 6 illustrates one embodiment of a first logic flow.

FIG. 6 illustrates one embodiment of a logic flow 600, which may be representative of the operations executed by one or more embodiments described herein. More particularly, logic flow 600 may be representative of operations that a source device may perform in conjunction with the use of interference mitigation techniques in a DMG network. For example, logic flow 600 may be representative of operations performed by source 108 in communications flow 300 of FIG. 3. In various embodiments, an apparatus may comprise logic, at least a portion of which is in hardware, to perform one or more of the operations described in logic flow 600. For example, in some embodiments, apparatus 200 and/or system 240 may operate as a source device in a DMG network, and communications component 206 may comprise logic, at least a portion of which is in hardware, to perform one or more of the operations described in logic flow 600. The embodiments are not limited in this context.

As shown in logic flow 600, at 602, a first RDG may be sent that indicates that a sink device may transmit to a source device. For example, source 108 of FIG. 3 may be operative to send RDG 302 to sink 112, and RDG 302 may indicate that sink 112 may transmit to source 108. At 604, interference with a received sink device data transmission may be detected at the source device. For example, source 108 of FIG. 3 may be operative to detect interference with data transmission 304 of sink 112. In various embodiments, it may be determined that the received sink device data transmission includes an acknowledgment request, and an acknowledgment of the received sink device data transmission may be withheld based on the detected interference. In some embodiments, the interference may be detected based on one or more failed CRC validations. In various embodiments, a PLCP header of the received sink device data transmission may be successfully received and the received sink device data transmission may be identified based on the PLCP header.

At 606, a grant deferral period may be selected. For example, source 108 of FIG. 3 may be operative to select grant deferral period 308. In some embodiments, the grant deferral period may be randomly selected. In various embodiments, the grant deferral period may be selected subject to a constraint that it should elapse prior to a time duration with respect to which the source device comprises a TXOP holder. At 608, upon conclusion of the grant deferral period, a second RDG may be sent that indicates that the sink device may transmit to the source device. For example, upon conclusion of the grant deferral period 308 of FIG. 3, source 108 may be operative to send RDG 312 to sink 112, and RDG 312 may indicate that sink 112 may transmit to source 108. The embodiments are not limited to these examples.

Figure 7:
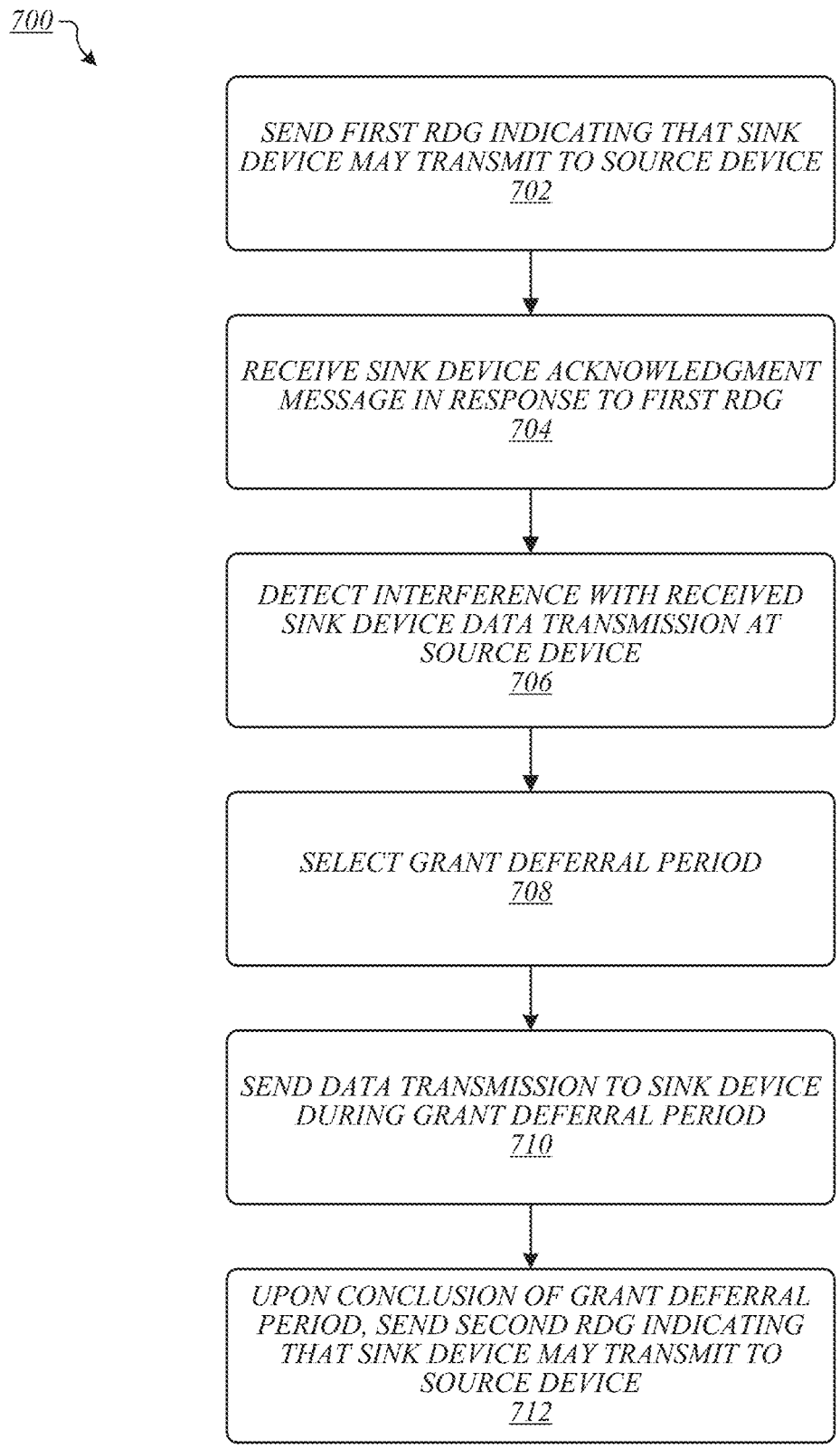
FIG. 7 illustrates one embodiment of a second logic flow.

FIG. 7 illustrates one embodiment of a logic flow 700, which may be representative of the operations executed by one or more embodiments described herein. More particularly, logic flow 700 may be representative of operations that a source device may perform in conjunction with the use of interference mitigation techniques in a DMG network. For example, logic flow 700 may be representative of operations performed by source 108 in communications flow 400 of FIG. 4. In some embodiments, an apparatus may comprise logic, at least a portion of which is in hardware, to perform one or more of the operations described in logic flow 700. For example, in various embodiments, apparatus 200 and/or system 240 may operate as a source device in a DMG network, and communications component 206 may comprise logic, at least a portion of which is in hardware, to perform one or more of the operations described in logic flow 700. The embodiments are not limited in this context.

As shown in logic flow 700, at 702, a first RDG may be sent that indicates that a sink device may transmit to a source device. For example, source 108 of FIG. 4 may be operative to send RDG 402 to sink 112, and RDG 402 may indicate that sink 112 may transmit to source 108. At 704, a sink device acknowledgment message may be received in response to the first RDG. For example, source 108 of FIG. 4 may be operative to receive acknowledgment message 404 from sink 112 in response to RDG 402. At 706, interference with a received sink device data transmission may be detected at the source device. For example, source 108 of FIG. 4 may be operative to detect interference with data transmission 406 of sink 112. In some embodiments, it may be determined that the received sink device data transmission includes an acknowledgment request, and an acknowledgment of the received sink device data transmission may be withheld based on the detected interference. In various embodiments, the interference may be detected based on one or more failed CRC validations. In some embodiments, a PLCP header of the received sink device data transmission may be successfully received and the received sink device data transmission may be identified based on the PLCP header.

At 708, a grant deferral period may be selected. For example, source 108 of FIG. 4 may be operative to select grant deferral period 410. In various embodiments, the grant deferral period may be randomly selected. In some embodiments, the grant deferral period may be selected subject to a constraint that it should elapse prior to a time duration with respect to which the source device comprises a TXOP holder. At 710, a data transmission may be sent to the sink device during the grant deferral period. For example, source 108 of FIG. 4 may be operative to send data transmission 412 to sink 112 during grant deferral period 410. In various embodiments, the data transmission may be sent to the sink device during the grant deferral period based on receipt of the sink device acknowledgment message. At 712, upon conclusion of the grant deferral period, a second RDG may be sent that indicates that the sink device may transmit to the source device. For example, upon conclusion of the grant deferral period 410 of FIG. 4, source 108 may be operative to send RDG 418 to sink 112, and RDG 418 may indicate that sink 112 may transmit to source 108. The embodiments are not limited to these examples.

Figure 8:
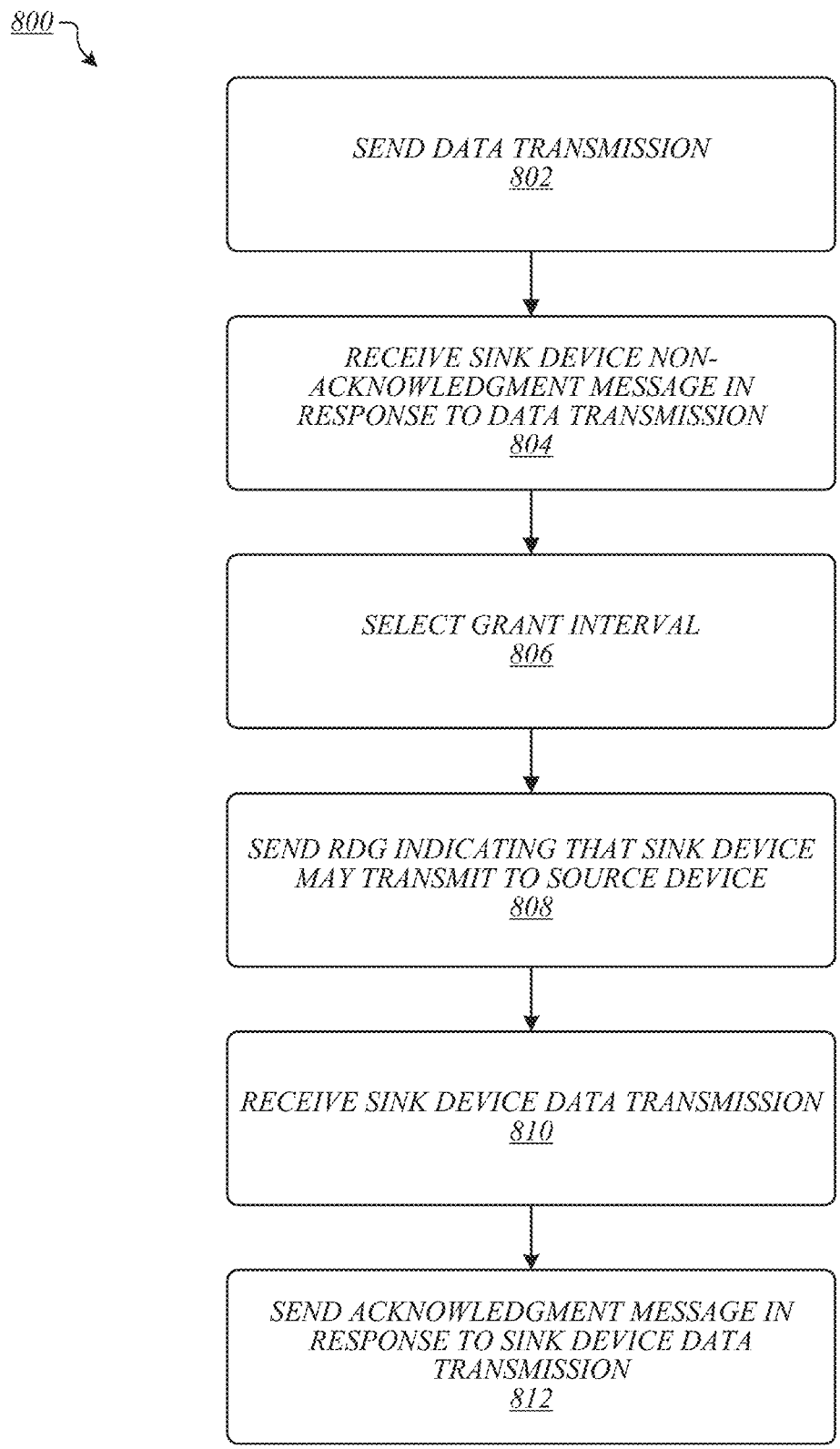
FIG. 8 illustrates one embodiment of a third logic flow.

FIG. 8 illustrates one embodiment of a logic flow 800, which may be representative of the operations executed by one or more embodiments described herein. More particularly, logic flow 800 may be representative of operations that a source device may perform in conjunction with the use of interference mitigation techniques in a DMG network. For example, logic flow 800 may be representative of operations performed by source 108 in communications flow 500 of FIG. 5. In some embodiments, an apparatus may comprise logic, at least a portion of which is in hardware, to perform one or more of the operations described in logic flow 800. For example, in various embodiments, apparatus 200 and/or system 240 may operate as a source device in a DMG network, and communications component 206 may comprise logic, at least a portion of which is in hardware, to perform one or more of the operations described in logic flow 800. The embodiments are not limited in this context.

As shown in logic flow 800, at 802, a data transmission may be sent. For example, source 108 of FIG. 5 may be operative to send data transmission 502 to sink 112. At 804, a sink device non-acknowledgment message may be received in response to the data transmission. For example, source 108 of FIG. 5 may be operative to receive non-acknowledgment message 506 from sink 112 in response to data transmission 502. At 806, a grant interval may be selected. For example, source 108 of FIG. 5 may be operative to select grant interval 508. In some embodiments, the grant interval may be randomly selected. In various embodiments, the grant interval may be selected subject to a constraint that it should elapse prior to a time duration with respect to which the source device comprises a TXOP holder.

At 808, an RDG may be sent that indicates that a sink device may transmit to the source device. For example, source 108 of FIG. 5 may be operative to send RDG 510 to sink 112, and RDG 510 may indicate that sink 112 may transmit to source 108. At 810, a sink device data transmission may be received. For example, source 108 of FIG. 5 may be operative to receive data transmission 512 from sink 112. At 812, an acknowledgment message may be sent in response to the sink device data transmission. For example, source 108 of FIG. 5 may be operative to send acknowledgment message 514 to sink 112 in response to data transmission 512. The embodiments are not limited to these examples.

Figure 9:
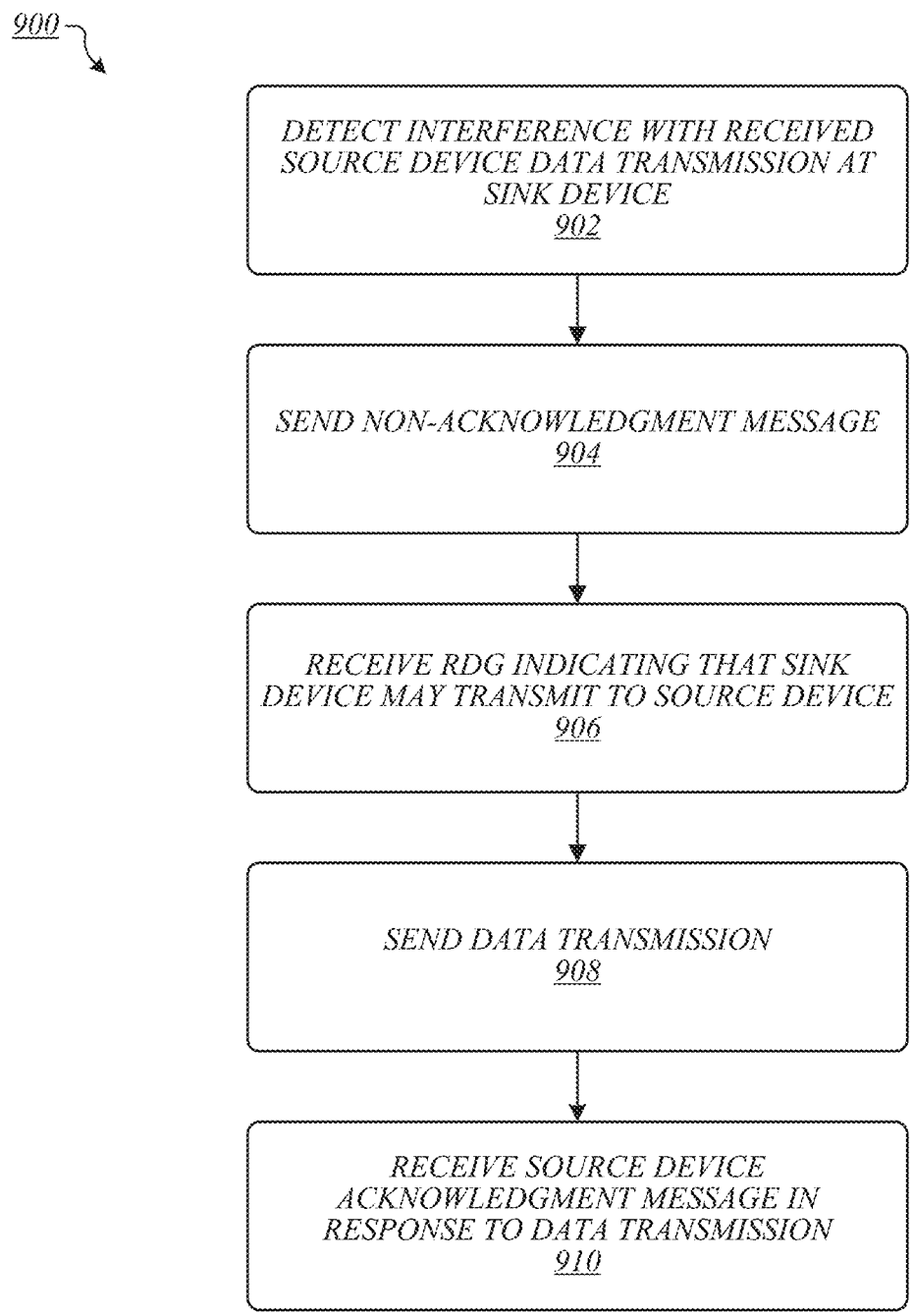
FIG. 9 illustrates one embodiment of a fourth logic flow.

FIG. 9 illustrates one embodiment of a logic flow 900, which may be representative of the operations executed by one or more embodiments described herein. More particularly, logic flow 900 may be representative of operations that a sink device may perform in conjunction with the use of interference mitigation techniques in a DMG network. For example, logic flow 900 may be representative of operations performed by sink 112 in communications flow 500 of FIG. 5. In some embodiments, an apparatus may comprise logic, at least a portion of which is in hardware, to perform one or more of the operations described in logic flow 900. For example, in various embodiments, apparatus 200 and/or system 240 may operate as a sink device in a DMG network, and communications component 206 may comprise logic, at least a portion of which is in hardware, to perform one or more of the operations described in logic flow 900. The embodiments are not limited in this context.

As shown in logic flow 900, at 902, interference with a received source device data transmission may be detected at a sink device. For example, sink 112 of FIG. 5 may be operative to detect interference with data transmission 502 of source 108. In some embodiments, the interference may be detected based on one or more failed CRC validations. In various embodiments, a PLCP header of the received source device data transmission may be successfully received and the received source device data transmission may be identified based on the PLCP header. At 904, a non-acknowledgment message may be sent based on the detected interference. For example, sink 112 of FIG. 5 may be operative to send non-acknowledgement message 506 to source 108 based on detecting interference with data transmission 502.

At 906, an RDG may be received that indicates that the sink device may transmit to the source device. For example, sink 112 of FIG. 5 may be operative to receive RDG 510 from source 108, and RDG 510 may indicate that sink 112 may transmit to source 108. At 908, a data transmission may be sent. For example, sink 112 of FIG. 5 may be operative to send data transmission 512 to source 108. At 910, a source device acknowledgment message may be received in response to the data transmission. For example, sink 112 of FIG. 5 may be operative to receive acknowledgment message 514 from source 108 in response to data transmission 512. The embodiments are not limited to these examples.

Figure 10:
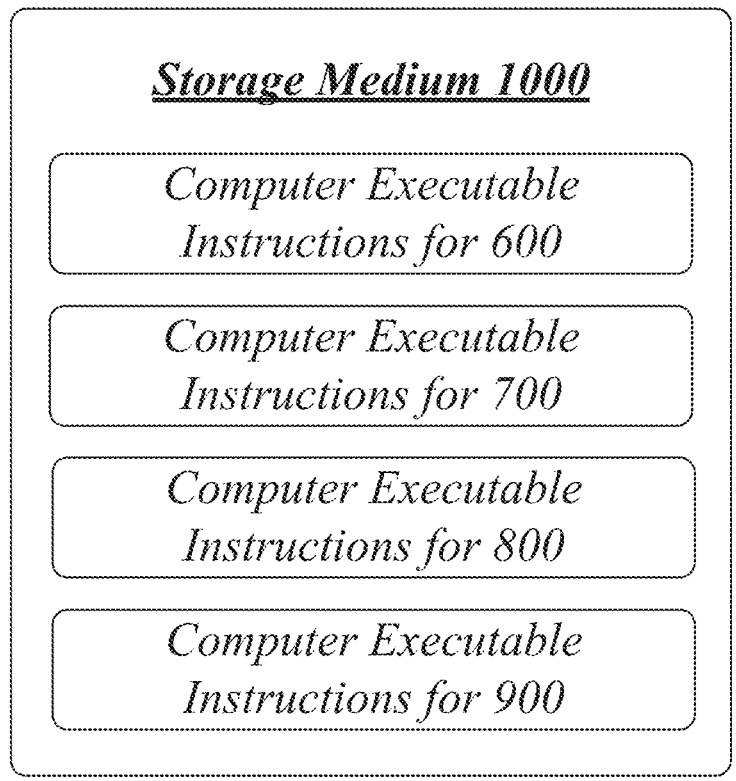
FIG. 10 illustrates one embodiment of a storage medium.

FIG. 10 illustrates an embodiment of a storage medium 1000. The storage medium 1000 may comprise an article of manufacture. In one embodiment, the storage medium 1000 may comprise any non-transitory computer-readable medium or machine-readable medium, such as an optical, magnetic or semiconductor storage. The storage medium may store various types of computer-executable instructions 1002, such as instructions that, when executed, cause a device to perform communications according to communications flow 300 of FIG. 3, communications flow 400 of FIG. 4, communications flow 500 of FIG. 5, logic flow 600 of FIG. 6, logic flow 700 of FIG. 7, logic flow 800 of FIG. 8, and/or logic flow 900 of FIG. 9. Examples of a computer-readable or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 11:
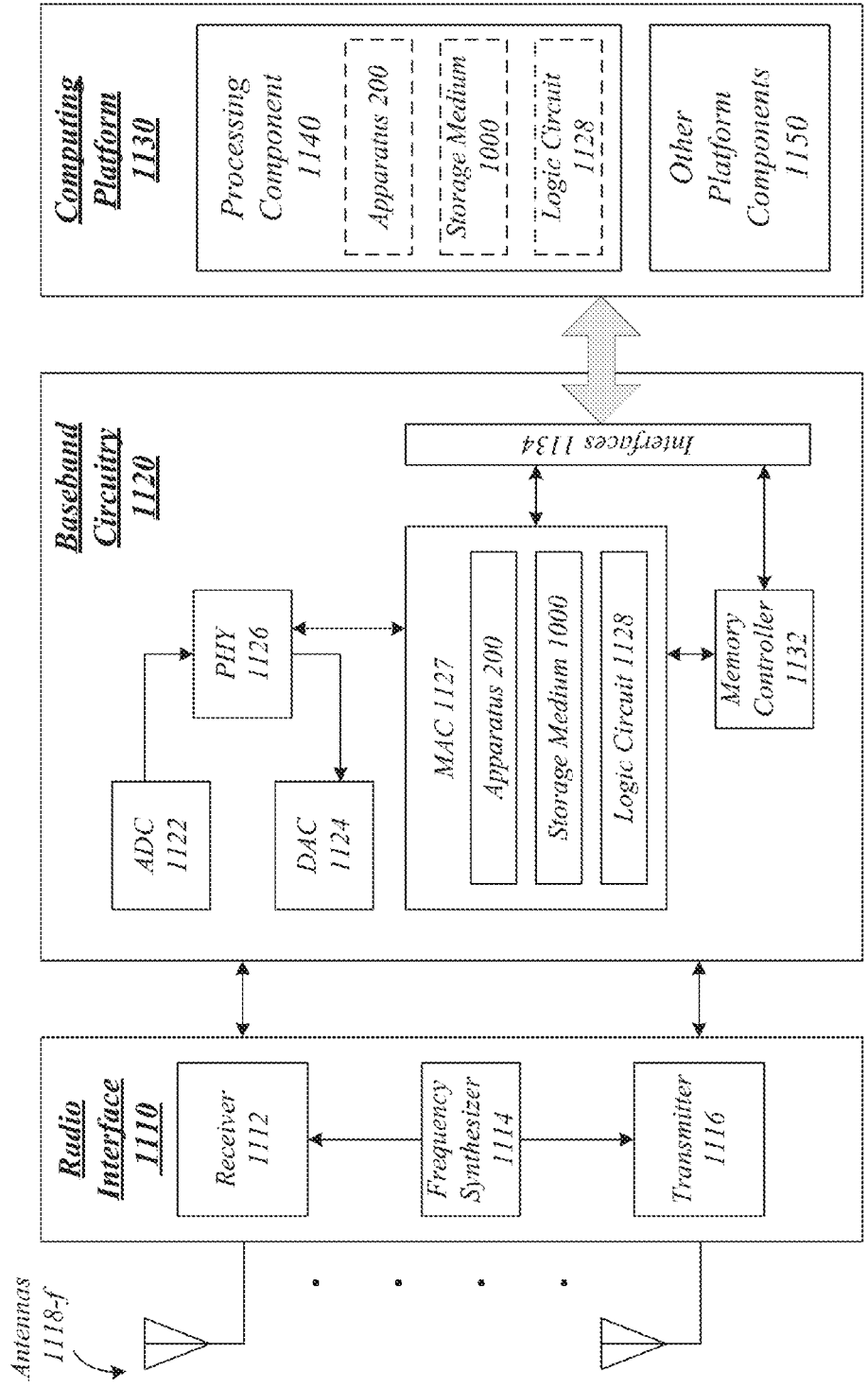
FIG. 11 illustrates one embodiment of a device.

FIG. 11 illustrates an embodiment of a communications device 1100 that may implement one or more of source 108, sink 112, apparatus 200 and/or system 240, logic flow 600, logic flow 700, logic flow 800, logic flow 900, and storage medium 1000. In various embodiments, device 1100 may comprise a logic circuit 1128. The logic circuit 1128 may include physical circuits to perform operations described for one or more of source 108 and sink 112, for example. As shown in FIG. 11, device 1100 may include a radio interface 1110, baseband circuitry 1120, and computing platform 1130, although the embodiments are not limited to this configuration.

The device 1100 may implement some or all of the structure and/or operations for one or more of source 108, sink 112, apparatus 200 and/or system 240, logic flow 600, logic flow 700, logic flow 800, logic flow 900, and storage medium 1000, and logic circuit 1128 in a single computing entity, such as entirely within a single device. Alternatively, the device 1100 may distribute portions of the structure and/or operations for one or more of source 108, sink 112, apparatus 200 and/or system 240, logic flow 600, logic flow 700, logic flow 800, logic flow 900, and storage medium 1000, and logic circuit 1128 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a frequency synthesizer 1114, and/or a transmitter 1116. Radio interface 1110 may include bias controls, a crystal oscillator and/or one or more antennas 1118-f. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1126 for PHY link layer processing of respective receive/transmit signals. Baseband circuitry 1120 may include, for example, a medium access control (MAC) processing circuit 1127 for MAC/data link layer processing. Baseband circuitry 1120 may include a memory controller 1132 for communicating with MAC processing circuit 1127 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames. Alternatively or in addition, MAC processing circuit 1127 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for one or more of source 108, sink 112, apparatus 200 and/or system 240, logic flow 600, logic flow 700, logic flow 800, logic flow 900, and storage medium 1000, and logic circuit 1128 using the processing component 1140. The processing component 1140 (and/or PHY 1126 and/or MAC 1127) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired.

Embodiments of device 1100 may be implemented using single input single output (SISO) architectures. However, certain implementations may include multiple antennas (e.g., antennas 1118-f) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 12:
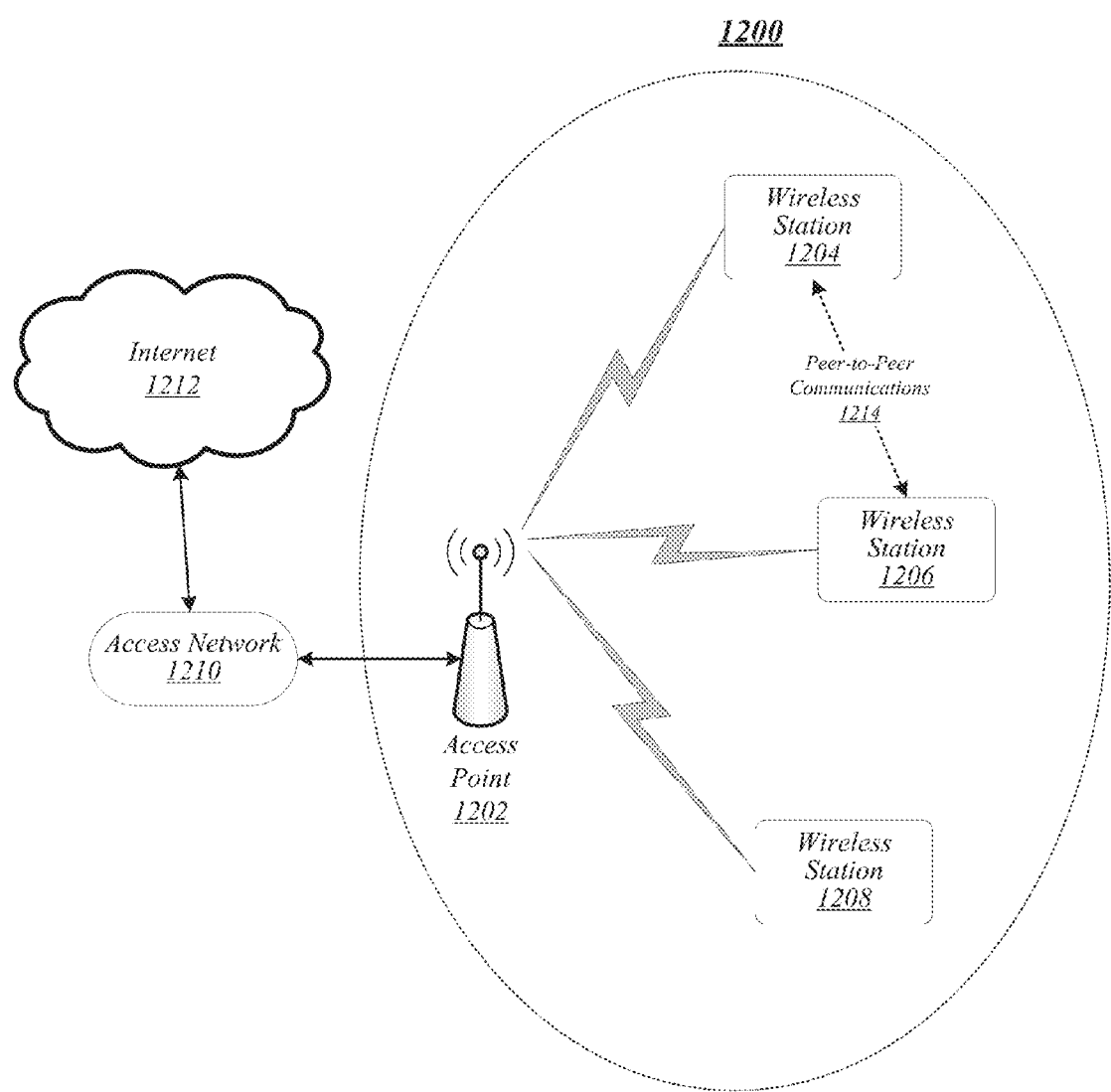
FIG. 12 illustrates one embodiment of a wireless network.

FIG. 12 illustrates an embodiment of a wireless network 1200. As shown in FIG. 12, wireless network comprises an access point 1202 and wireless stations 1204, 1206, and 1208. In various embodiments, wireless network 1200 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1200 may comprise another type of wireless network, and/or may implement other wireless communications standards. In various embodiments, for example, wireless network 1200 may comprise a WWAN or WPAN rather than a WLAN. The embodiments are not limited to this example.

In some embodiments, wireless network 1200 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1204, 1206, and 1208 may communicate with access point 1202 in order to obtain connectivity to one or more external data networks. In some embodiments, for example, wireless stations 1204, 1206, and 1208 may connect to the Internet 1212 via access point 1202 and access network 1210. In various embodiments, access network 1210 may comprise a private network that provides subscription-based Internet-connectivity, such as an Internet Service Provider (ISP) network. The embodiments are not limited to this example.

In various embodiments, two or more of wireless stations 1204, 1206, and 1208 may communicate with each other directly by exchanging peer-to-peer communications. For example, in the example of FIG. 12, wireless stations 1204 and 1206 communicate with each other directly by exchanging peer-to-peer communications 1214. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a wireless communication apparatus, comprising logic, at least a portion of which is in hardware, the logic to send, from a source device, a first reverse direction grant (RDG) indicating that a sink device may transmit to the source device, detect interference with a received sink device data transmission at the source device, select a grant deferral period, and upon conclusion of the grant deferral period, send a second RDG indicating that the sink device may transmit to the source device.

In Example 2, the logic of Example 1 may optionally determine that the received sink device data transmission includes an acknowledgment request and withhold an acknowledgment of the received sink device data transmission based on the detected interference.

In Example 3, the logic of any of Examples 1 to 2 may optionally detect the interference with the received sink device data transmission based on a failed cyclic redundancy code (CRC) validation.

In Example 4, the logic of any of Examples 1 to 3 may optionally successfully receive a physical layer convergence procedure (PLCP) header of the received sink device data transmission and identify the received sink device data transmission based on the PLCP header.

In Example 5, the logic of any of Examples 1 to 4 may optionally receive a sink device acknowledgment message in response to the first RDG prior to receiving the received sink device data transmission and send a data transmission to the sink device during the grant deferral period.

In Example 6, the sink device acknowledgment message of Example 5 may optionally comprise a quality of service (QoS) media access control (MAC) protocol data unit (MPDU) or a block acknowledgment (BA) MPDU.

In Example 7, the logic of any of Examples 1 to 6 may optionally randomly select the grant deferral period.

In Example 8, the logic of any of Examples 1 to 7 may optionally send the second RDG prior to an expiration of a time duration identified by a field in the first RDG.

In Example 9, the source device of any of Examples 1 to 8 may optionally comprise a transmission opportunity (TXOP) holder.

In Example 10, the source device of any of Examples 1 to 9 may optionally be comprised in a first private basic service set (PBSS), and the detected interference may optionally originate from a device in a second PBSS that overlaps with the first PBSS.

In Example 11, the source device of any of Examples 1 to 10 may optionally be comprised in a directional multi-gigabit (DMG) wireless network.

In Example 12, the source device of any of Examples 1 to 11 may optionally be operative to communicate according to an Institute of Electrical and Electronics Engineers (IEEE) 802.11ad-2012 standard.

Example 13 is a system, comprising a wireless communication apparatus according to any of Examples 1 to 12, a radio frequency (RF) transceiver, and one or more RF antennas.

Example 14 is at least one non-transitory machine-readable medium comprising a set of wireless communication instructions that, in response to being executed on a computing device, cause the computing device to send, from a source device, a first reverse direction grant (RDG) indicating that a sink device may transmit to the source device, detect interference with a received sink device data transmission at the source device, select a grant deferral period, and upon conclusion of the grant deferral period, send a second RDG indicating that the sink device may transmit to the source device.

In Example 15, the at least one non-transitory machine-readable medium of Example 14 may optionally comprise wireless communication instructions that, in response to being executed on the computing device, cause the computing device to determine that the received sink device data transmission includes an acknowledgment request, and withhold an acknowledgment of the received sink device data transmission based on the detected interference.

In Example 16, the at least one non-transitory machine-readable medium of any of Examples 14 to 15 may optionally comprise wireless communication instructions that, in response to being executed on the computing device, cause the computing device to detect the interference with the received sink device data transmission based on a failed cyclic redundancy code (CRC) validation.

In Example 17, the at least one non-transitory machine-readable medium of any of Examples 14 to 16 may optionally comprise wireless communication instructions that, in response to being executed on the computing device, cause the computing device to successfully receive a physical layer convergence procedure (PLCP) header of the received sink device data transmission, and identify the received sink device data transmission based on the PLCP header.

In Example 18, the at least one non-transitory machine-readable medium of any of Examples 14 to 17 may optionally comprise wireless communication instructions that, in response to being executed on the computing device, cause the computing device to receive a sink device acknowledgment message in response to the first RDG prior to receiving the received sink device data transmission, and send a data transmission to the sink device during the grant deferral period.

In Example 19, the sink device acknowledgment message of Example 18 may optionally comprise a quality of service (QoS) media access control (MAC) protocol data unit (MPDU) or a block acknowledgment (BA) MPDU.

In Example 20, the at least one non-transitory machine-readable medium of any of Examples 14 to 19 may optionally comprise wireless communication instructions that, in response to being executed on the computing device, cause the computing device to randomly select the grant deferral period.

In Example 21, the at least one non-transitory machine-readable medium of any of Examples 14 to 20 may optionally comprise wireless communication instructions that, in response to being executed on the computing device, cause the computing device to send the second RDG prior to an expiration of a time duration identified by a field in the first RDG.

In Example 22, the source device of any of Examples 14 to 21 may optionally comprise a transmission opportunity (TXOP) holder.

In Example 23, the source device of any of Examples 14 to 22 may optionally be comprised in a first private basic service set (PBSS), and the detected interference may optionally originate from a device in a second PBSS that overlaps with the first PBSS.

In Example 24, the source device of any of Examples 14 to 23 may optionally be comprised in a directional multi-gigabit (DMG) wireless network.

In Example 25, the source device of any of Examples 14 to 24 may optionally be operative to communicate according to an Institute of Electrical and Electronics Engineers (IEEE) 802.11ad-2012 standard.

Example 26 is a wireless communication method, comprising sending, from a source device, a first reverse direction grant (RDG) indicating that a sink device may transmit to the source device, detecting interference with a received sink device data transmission at the source device, selecting, by a processor circuit, a grant deferral period, and upon conclusion of the grant deferral period, sending a second RDG indicating that the sink device may transmit to the source device.

In Example 27, the wireless communication method of Example 26 may optionally comprise determining that the received sink device data transmission includes an acknowledgment request, and withholding an acknowledgment of the received sink device data transmission based on the detected interference.

In Example 28, the wireless communication method of any of Examples 26 to 27 may optionally comprise detecting the interference with the received sink device data transmission based on a failed cyclic redundancy code (CRC) validation.

In Example 29, the wireless communication method of any of Examples 26 to 28 may optionally comprise successfully receiving a physical layer convergence procedure (PLCP) header of the received sink device data transmission, and identifying the received sink device data transmission based on the PLCP header.

In Example 30, the wireless communication method of any of Examples 26 to 29 may optionally comprise receiving a sink device acknowledgment message in response to the first RDG prior to receiving the received sink device data transmission, and sending a data transmission to the sink device during the grant deferral period.

In Example 31, the sink device acknowledgment message of Example 30 may optionally comprise a quality of service (QoS) media access control (MAC) protocol data unit (MPDU) or a block acknowledgment (BA) MPDU.

In Example 32, the wireless communication method of any of Examples 26 to 31 may optionally comprise randomly selecting the grant deferral period.

In Example 33, the wireless communication method of any of Examples 26 to 32 may optionally comprise sending the second RDG prior to an expiration of a time duration identified by a field in the first RDG.

In Example 34, the source device of any of Examples 26 to 33 may optionally comprise a transmission opportunity (TXOP) holder.

In Example 35, the source device of any of Examples 26 to 34 may optionally be comprised in a first private basic service set (PBSS), and the detected interference may optionally originate from a device in a second PBSS that overlaps with the first PBSS.

In Example 36, the source device of any of Examples 26 to 35 may optionally be comprised in a directional multi-gigabit (DMG) wireless network.

In Example 37, the source device of any of Examples 26 to 36 may optionally be operative to communicate according to an Institute of Electrical and Electronics Engineers (IEEE) 802.11ad-2012 standard.

Example 38 is at least one machine-readable medium comprising a set of instructions that, in response to being executed on a computing device, cause the computing device to perform a wireless communication method according to any of Examples 26 to 37.

Example 39 is an apparatus, comprising means for performing a wireless communication method according to any of Examples 26 to 37.

Example 40 is a system, comprising an apparatus according to Example 39, a radio frequency (RF) transceiver, and one or more RF antennas.

Example 41 is a wireless communication apparatus, comprising means for sending, from a source device, a first reverse direction grant (RDG) indicating that a sink device may transmit to the source device, means for detecting interference with a received sink device data transmission at the source device, means for selecting a grant deferral period, and means for, upon conclusion of the grant deferral period, sending a second RDG indicating that the sink device may transmit to the source device.

In Example 42, the wireless communication apparatus of Example 41 may optionally comprise means for determining that the received sink device data transmission includes an acknowledgment request, and means for withholding an acknowledgment of the received sink device data transmission based on the detected interference.

In Example 43, the wireless communication apparatus of any of Examples 41 to 42 may optionally comprise means for detecting the interference with the received sink device data transmission based on a failed cyclic redundancy code (CRC) validation.

In Example 44, the wireless communication apparatus of any of Examples 41 to 43 may optionally comprise means for successfully receiving a physical layer convergence procedure (PLCP) header of the received sink device data transmission, and means for identifying the received sink device data transmission based on the PLCP header.

In Example 45, the wireless communication apparatus of any of Examples 41 to 44 may optionally comprise means for receiving a sink device acknowledgment message in response to the first RDG prior to receiving the received sink device data transmission, and means for sending a data transmission to the sink device during the grant deferral period.

In Example 46, the sink device acknowledgment message of Example 45 may optionally comprise a quality of service (QoS) media access control (MAC) protocol data unit (MPDU) or a block acknowledgment (BA) MPDU.

In Example 47, the wireless communication apparatus of any of Examples 41 to 46 may optionally comprise means for randomly selecting the grant deferral period.

In Example 48, the wireless communication apparatus of any of Examples 41 to 47 may optionally comprise means for sending the second RDG prior to an expiration of a time duration identified by a field in the first RDG.

In Example 49, the source device of any of Examples 41 to 48 may optionally comprise a transmission opportunity (TXOP) holder.

In Example 50, the source device of any of Examples 41 to 49 may optionally be comprised in a first private basic service set (PBSS), and the detected interference may optionally originate from a device in a second PBSS that overlaps with the first PBSS.

In Example 51, the source device of any of Examples 41 to 50 may optionally be comprised in a directional multi-gigabit (DMG) wireless network.

In Example 52, the source device of any of Examples 41 to 51 may optionally be operative to communicate according to an Institute of Electrical and Electronics Engineers (IEEE) 802.11ad-2012 standard.

Example 53 is a system, comprising a wireless communication apparatus according to any of Examples 41 to 52, a radio frequency (RF) transceiver, and one or more RF antennas.

Example 54 is a wireless communication apparatus, comprising logic, at least a portion of which is in hardware, the logic to send a data transmission from a source device, receive a sink device non-acknowledgment message in response to the data transmission, select a grant interval, and send a reverse direction grant (RDG) during the grant interval, the RDG indicating that a sink device may transmit to the source device.

In Example 55, the sink device non-acknowledgment message of Example 54 may optionally comprise a quality of service (QoS) null message.

In Example 56, the logic of any of Examples 54 to 55 may optionally receive a sink device data transmission during the grant interval in response to the RDG.

In Example 57, the logic of Example 56 may optionally send an acknowledgment message in response to the sink device data transmission.

In Example 58, the logic of any of Examples 54 to 57 may optionally retransmit one or more portions of the data transmission following the grant interval.

In Example 59, the source device of any of Examples 54 to 58 may optionally comprise a transmission opportunity (TXOP) holder for a time duration identified in the RDG.

In Example 60, the source device of any of Examples 54 to 59 may optionally be comprised in a directional multi-gigabit (DMG) wireless network.

In Example 61, the source device of any of Examples 54 to 60 may optionally be operative to communicate according to an Institute of Electrical and Electronics Engineers (IEEE) 802.11ad-2012 standard.

Example 62 is a system, comprising a wireless communication apparatus according to any of Examples 54 to 61, a radio frequency (RF) transceiver, and one or more RF antennas.

Example 63 is at least one non-transitory machine-readable medium comprising a set of wireless communication instructions that, in response to being executed on a computing device, cause the computing device to send a data transmission from a source device, receive a sink device non-acknowledgment message in response to the data transmission, select a grant interval, and send a reverse direction grant (RDG) during the grant interval, the RDG indicating that a sink device may transmit to the source device.

In Example 64, the sink device non-acknowledgment message of Example 63 may optionally comprise a quality of service (QoS) null message.

In Example 65, the at least one non-transitory machine-readable medium of any of Examples 63 to 64 may optionally comprise wireless communication instructions that, in response to being executed on the computing device, cause the computing device to receive a sink device data transmission during the grant interval in response to the RDG.

In Example 66, the at least one non-transitory machine-readable medium of Example 65 may optionally comprise wireless communication instructions that, in response to being executed on the computing device, cause the computing device to send an acknowledgment message in response to the sink device data transmission.

In Example 67, the at least one non-transitory machine-readable medium of any of Examples 63 to 66 may optionally comprise wireless communication instructions that, in response to being executed on the computing device, cause the computing device to retransmit one or more portions of the data transmission following the grant interval.

In Example 68, the source device of any of Examples 63 to 67 may optionally comprise a transmission opportunity (TXOP) holder for a time duration identified in the RDG.

In Example 69, the source device of any of Examples 63 to 68 may optionally be comprised in a directional multi-gigabit (DMG) wireless network.

In Example 70, the source device of any of Examples 63 to 69 may optionally be operative to communicate according to an Institute of Electrical and Electronics Engineers (IEEE) 802.11ad-2012 standard.

Example 71 is a wireless communication method, comprising sending a data transmission from a source device, receiving a sink device non-acknowledgment message in response to the data transmission, selecting, by a processor circuit, a grant interval, and sending a reverse direction grant (RDG) during the grant interval, the RDG indicating that a sink device may transmit to the source device.

In Example 72, the sink device non-acknowledgment message of Example 71 may optionally comprise a quality of service (QoS) null message.

In Example 73, the wireless communication method of any of Examples 71 to 72 may optionally comprise receiving a sink device data transmission during the grant interval in response to the RDG.

In Example 74, the wireless communication method of Example 73 may optionally comprise sending an acknowledgment message in response to the sink device data transmission.

In Example 75, the wireless communication method of any of Examples 71 to 74 may optionally comprise retransmitting one or more portions of the data transmission following the grant interval.

In Example 76, the source device of any of Examples 71 to 75 may optionally comprise a transmission opportunity (TXOP) holder for a time duration identified in the RDG.

In Example 77, the source device of any of Examples 71 to 76 may optionally be comprised in a directional multi-gigabit (DMG) wireless network.

In Example 78, the source device of any of Examples 71 to 77 may optionally be operative to communicate according to an Institute of Electrical and Electronics Engineers (IEEE) 802.11ad-2012 standard.

Example 79 is at least one machine-readable medium comprising a set of instructions that, in response to being executed on a computing device, cause the computing device to perform a wireless communication method according to any of Examples 71 to 78.

Example 80 is an apparatus, comprising means for performing a wireless communication method according to any of Examples 71 to 78.

Example 81 is a system, comprising an apparatus according to Example 80, a radio frequency (RF) transceiver, and one or more RF antennas.

Example 82 is a wireless communication apparatus, comprising means for sending a data transmission from a source device, means for receiving a sink device non-acknowledgment message in response to the data transmission, means for selecting a grant interval, and means for sending a reverse direction grant (RDG) during the grant interval, the RDG indicating that a sink device may transmit to the source device.

In Example 83, the sink device non-acknowledgment message of Example 82 may optionally comprise a quality of service (QoS) null message.

In Example 84, the wireless communication apparatus of any of Examples 82 to 83 may optionally comprise means for receiving a sink device data transmission during the grant interval in response to the RDG.

In Example 85, the wireless communication apparatus of Example 84 may optionally comprise means for sending an acknowledgment message in response to the sink device data transmission.

In Example 86, the wireless communication apparatus of any of Examples 82 to 85 may optionally comprise means for retransmitting one or more portions of the data transmission following the grant interval.

In Example 87, the source device of any of Examples 82 to 86 may optionally comprise a transmission opportunity (TXOP) holder for a time duration identified in the RDG.

In Example 88, the source device of any of Examples 82 to 87 may optionally be comprised in a directional multi-gigabit (DMG) wireless network.

In Example 89, the source device of any of Examples 82 to 88 may optionally be operative to communicate according to an Institute of Electrical and Electronics Engineers (IEEE) 802.11ad-2012 standard.

Example 90 is a system, comprising a wireless communication apparatus according to any of Examples 82 to 89, a radio frequency (RF) transceiver, and one or more RF antennas.

Example 91 is a wireless communication apparatus, comprising logic, at least a portion of which is in hardware, the logic to detect, at a sink device, interference with a received source device data transmission, send a non-acknowledgment message based on the detected interference, and receive a reverse direction grant (RDG) in response to the non-acknowledgment message, the RDG indicating that the sink device may transmit to a source device.

In Example 92, the non-acknowledgment message of Example 91 may optionally comprise a quality of service (QoS) null message.

In Example 93, the logic of any of Examples 91 to 92 may optionally send a data transmission in response to the RDG.

In Example 94, the logic of Example 93 may optionally receive a source device acknowledgment message in response to the data transmission.

In Example 95, the logic of any of Examples 91 to 94 may optionally receive a retransmission of one or more portions of the received source device data transmission following a grant interval.

In Example 96, the sink device of any of Examples 91 to 95 may optionally be comprised in a first private basic service set (PBSS), and the detected interference may optionally originate from a device in a second PBSS that overlaps with the first PBSS.

In Example 97, the sink device of any of Examples 91 to 96 may optionally be comprised in a directional multi-gigabit (DMG) wireless network.

In Example 98, the sink device of any of Examples 91 to 97 may optionally be operative to communicate according to an Institute of Electrical and Electronics Engineers (IEEE) 802.11ad-2012 standard.

Example 99 is a system, comprising a wireless communication apparatus according to any of Examples 91 to 98, a radio frequency (RF) transceiver, and one or more RF antennas.

Example 100 is at least one non-transitory machine-readable medium comprising a set of wireless communication instructions that, in response to being executed on a computing device, cause the computing device to detect, at a sink device, interference with a received source device data transmission, send a non-acknowledgment message based on the detected interference, and receive a reverse direction grant (RDG) in response to the non-acknowledgment message, the RDG indicating that the sink device may transmit to a source device.

In Example 101, the non-acknowledgment message of Example 100 may optionally comprise a quality of service (QoS) null message.

In Example 102, the at least one non-transitory machine-readable medium of any of Examples 100 to 101 may optionally comprise wireless communication instructions that, in response to being executed on the computing device, cause the computing device to send a data transmission in response to the RDG.

In Example 103, the at least one non-transitory machine-readable medium of Example 102 may optionally comprise wireless communication instructions that, in response to being executed on the computing device, cause the computing device to receive a source device acknowledgment message in response to the data transmission.

In Example 104, the at least one non-transitory machine-readable medium of any of Examples 100 to 103 may optionally comprise wireless communication instructions that, in response to being executed on the computing device, cause the computing device to receive a retransmission of one or more portions of the received source device data transmission following a grant interval.

In Example 105, the sink device of any of Examples 100 to 104 may optionally be comprised in a first private basic service set (PBSS), and the detected interference may optionally originate from a device in a second PBSS that overlaps with the first PBSS.

In Example 106, the sink device of any of Examples 100 to 105 may optionally be comprised in a directional multi-gigabit (DMG) wireless network.

In Example 107, the sink device of any of Examples 100 to 106 may optionally be operative to communicate according to an Institute of Electrical and Electronics Engineers (IEEE) 802.11ad-2012 standard.

Example 108 is a wireless communication method, comprising detecting, by a processor circuit at a sink device, interference with a received source device data transmission, sending a non-acknowledgment message based on the detected interference, and receiving a reverse direction grant (RDG) in response to the non-acknowledgment message, the RDG indicating that the sink device may transmit to a source device.

In Example 109, the non-acknowledgment message of Example 108 may optionally comprise a quality of service (QoS) null message.

In Example 110, the wireless communication method of any of Examples 108 to 109 may optionally comprise sending a data transmission in response to the RDG.

In Example 111, the wireless communication method of Example 110 may optionally comprise receiving a source device acknowledgment message in response to the data transmission.

In Example 112, the wireless communication method of any of Examples 108 to 111 may optionally comprise receiving a retransmission of one or more portions of the received source device data transmission following a grant interval.

In Example 113, the sink device of any of Examples 108 to 112 may optionally be comprised in a first private basic service set (PBSS), and the detected interference may optionally originate from a device in a second PBSS that overlaps with the first PBSS.

In Example 114, the sink device of any of Examples 108 to 113 may optionally be comprised in a directional multi-gigabit (DMG) wireless network.

In Example 115, the sink device of any of Examples 108 to 114 may optionally be operative to communicate according to an Institute of Electrical and Electronics Engineers (IEEE) 802.11ad-2012 standard.

Example 116 is at least one machine-readable medium comprising a set of instructions that, in response to being executed on a computing device, cause the computing device to perform a wireless communication method according to any of Examples 108 to 115.

Example 117 is an apparatus, comprising means for performing a wireless communication method according to any of Examples 108 to 115.

Example 118 is a system, comprising an apparatus according to Example 117, a radio frequency (RF) transceiver, and one or more RF antennas.

Example 119 is a wireless communication apparatus, comprising means for detecting, at a sink device, interference with a received source device data transmission, means for sending a non-acknowledgment message based on the detected interference, and means for receiving a reverse direction grant (RDG) in response to the non-acknowledgment message, the RDG indicating that the sink device may transmit to a source device.

In Example 120, the non-acknowledgment message of Example 119 may optionally comprise a quality of service (QoS) null message.

In Example 121, the wireless communication apparatus of any of Examples 119 to 120 may optionally comprise means for sending a data transmission in response to the RDG.

In Example 122, the wireless communication apparatus of Example 121 may optionally comprise means for receiving a source device acknowledgment message in response to the data transmission.

In Example 123, the wireless communication apparatus of any of Examples 119 to 122 may optionally comprise means for receiving a retransmission of one or more portions of the received source device data transmission following a grant interval.

In Example 124, the sink device of any of Examples 119 to 123 may optionally be comprised in a first private basic service set (PBSS), and the detected interference may optionally originate from a device in a second PBSS that overlaps with the first PBSS.

In Example 125, the sink device of any of Examples 119 to 124 may optionally be comprised in a directional multi-gigabit (DMG) wireless network.

In Example 126, the sink device of any of Examples 119 to 125 may optionally be operative to communicate according to an Institute of Electrical and Electronics Engineers (IEEE) 802.11ad-2012 standard.

Example 127 is a system, comprising a wireless communication apparatus according to any of Examples 119 to 126, a radio frequency (RF) transceiver, and one or more RF antennas.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
processing circuitry;
logic, at least a portion of which is operable by the processing circuitry, the logic to:
send, from a source device, a first reverse direction grant (RDG) indicating that a sink device is permitted to transmit to the source device during a time duration,
successfully receive a physical layer convergence procedure (PLCP) header of a received sink device data transmission and identify the received sink device data transmission based on the PLCP header,
detect interference with the received sink device data transmission at the source device based on one or more remaining portions of the received sink device data transmission unsuccessfully received,
in response to detection of the interference with the received sink device data transmission, randomly select a grant deferral period, the grant deferral period selected to elapse prior to the time duration, and
upon conclusion of the grant deferral period, send a second RDG indicating that the sink device is permitted to transmit to the source device during the time duration.

2. The apparatus of claim 1, the logic to determine that the received sink device data transmission includes an acknowledgment request and withhold an acknowledgment of the received sink device data transmission based on the detected interference.

3. The apparatus of claim 1, the logic to detect the interference with the received sink device data transmission based on a failed cyclic redundancy code (CRC) validation.

4. The apparatus of claim 1, the logic to receive a sink device acknowledgment message in response to the first RDG prior to receiving the received sink device data transmission and send a data transmission to the sink device during the grant deferral period.

5. The apparatus of claim 4, the sink device acknowledgment message comprising a quality of service (QoS) media access control (MAC) protocol data unit (MPDU) or a block acknowledgment (BA) MPDU.

6. The apparatus of claim 1, the logic to send the second RDG prior to an expiration of the time duration, the time duration identified by a field in the first RDG.

7. The apparatus of claim 1, comprising:
a radio frequency (RF) transceiver; and
one or more RF antennas.

8. At least one non-transitory machine-readable medium comprising a set of instructions that, in response to being executed on a computing device, cause the computing device to:
send, from a source device, a first reverse direction grant (RDG) indicating that a sink device is permitted to transmit to the source device during a time duration;
successfully receive a physical layer convergence procedure (PLCP) header of a received sink device data transmission;
identify the received sink device data transmission based on the PLCP header;
detect interference with a received sink device data transmission at the source device based on one or more remaining portions of the received sink device data transmission unsuccessfully received;
in response to detection of the interference with the received sink device data transmission, randomly select a grant deferral period, the grant deferral period selected to elapse prior to the time duration; and
upon conclusion of the grant deferral period, send a second RDG indicating that the sink device is permitted to transmit to the source device during the time duration.

9. The at least one non-transitory machine-readable medium of claim 8, comprising instructions that, in response to being executed on the computing device, cause the computing device to:
determine that the received sink device data transmission includes an acknowledgment request; and
withhold an acknowledgment of the received sink device data transmission based on the detected interference.

10. The at least one non-transitory machine-readable medium of claim 8, comprising instructions that, in response to being executed on the computing device, cause the computing device to detect the interference with the received sink device data transmission based on a failed cyclic redundancy code (CRC) validation.

11. The at least one non-transitory machine-readable medium of claim 8, comprising instructions that, in response to being executed on the computing device, cause the computing device to:
receive a sink device acknowledgment message in response to the first RDG prior to receiving the received sink device data transmission; and
send a data transmission to the sink device during the grant deferral period.

12. The at least one non-transitory machine-readable medium of claim 11, the sink device acknowledgment message comprising a quality of service (QoS) media access control (MAC) protocol data unit (MPDU) or a block acknowledgment (BA) MPDU.

13. The at least one non-transitory machine-readable medium of claim 8, comprising instructions that, in response to being executed on the computing device, cause the computing device to send the second RDG prior to an expiration of the time duration, the time duration identified by a field in the first RDG.

14. A method, comprising:
sending, from a source device, a first reverse direction grant (RDG) indicating that a sink device is permitted to transmit to the source device during a time duration;
successfully receive a physical layer convergence procedure (PLCP) header of a received sink device data transmission;
identify the received sink device data transmission based on the PLCP header;
detecting interference with a received sink device data transmission at the source device based on one or more remaining portions of the received sink device data transmission unsuccessfully received;
in response to detecting the interference with the received sink device data transmission, randomly selecting, by a processor circuit, a grant deferral period, the grant deferral period selected to elapse prior to the time duration; and
upon conclusion of the grant deferral period, sending a second RDG indicating that the sink device is permitted to transmit to the source device during the time duration.

15. The method of claim 14, comprising:
  determining that the received sink device data transmission includes an acknowledgment request; and
  withholding an acknowledgment of the received sink device data transmission based on the detected interference.

16. The method of claim 14, comprising detecting the interference with the received sink device data transmission based on a failed cyclic redundancy code (CRC) validation.

17. The method of claim 14, comprising:
  receiving a sink device acknowledgment message in response to the first RDG prior to receiving the received sink device data transmission; and
  sending a data transmission to the sink device during the grant deferral period.

18. The method of claim 17, the sink device acknowledgment message comprising a quality of service (QoS) media access control (MAC) protocol data unit (MPDU) or a block acknowledgment (BA) MPDU.

19. The method of claim 14, comprising sending the second RDG prior to an expiration of the time duration, the time duration identified by a field in the first RDG.

* * * * *